United States Patent

[11] 3,543,957

| [72] | Inventor | Derek Vincent Russell<br>2 Selbourne Ave, Low Fell, Gateshead 9, England |
|---|---|---|
| [21] | Appl. No. | 759,951 |
| [22] | Filed | Sept. 16, 1968 |
| [45] | Patented | Dec. 1, 1970 |
| [32] | Priority | Sept. 21, 1967 |
| [33] | | Great Britain |
| [31] | | No. 42,984/67 |

[54] FORK LIFT TRUCKS
6 Claims, 3 Drawing Figs.

[52] U.S. Cl. .................................................. 214/146.5, 214/770
[51] Int. Cl. ........................................................ B66c 23/00
[50] Field of Search ............................................ 214/770, 141, 778, 769, 762, 763, 764, 146.5

[56] References Cited
UNITED STATES PATENTS

| 2,820,555 | 1/1958 | Lessmann | 214/770 |
| 2,876,921 | 3/1959 | Salna | 214/763 |
| 3,070,244 | 12/1962 | Lull | 214/770 |
| 3,187,911 | 6/1965 | Christenson | 214/770 |
| 3,215,292 | 11/1965 | Halls | 214/770 |
| 3,403,801 | 10/1968 | Ulinski | 214/770 |

Primary Examiner—Hugo O. Schulz
Attorney—Jones and Lockwood

ABSTRACT: The invention provides a lift truck where the frame carrying the fork or other supporting member is mounted on a jib member, which itself is pivoted to link means pivotally mounted on the truck chassis. Means are provided to maintain the frame constantly in a substantially vertical attitude whatever the attitude of the jib member, though the frame can be tilted through a small angle when required. The jib member may be angled to provide a limb which can be brought almost down to ground level, and to the free end of which the frame is pivoted. The lift truck provides an exceptional range for the load being carried.

Patented Dec. 1, 1970

3,543,957

FORK LIFT TRUCKS

This invention relates to lift trucks having a substantially vertical frame in which a supporting member is displaceable upwards and downwards. Such trucks are usually called "forklift trucks" irrespective of whether the supporting member is in the form of a fork, and this designation will be used herein to cover lift trucks of this type, whether the supporting member is a fork or another form of platform. In such trucks, the frame above referred to can often be tilted to some extent round a horizontal axis, either to give added security to the load when the truck is being moved, or to discharge the load under its own weight.

In normal forklift trucks where the frame is directly mounted on the truck chassis, the range of movement of the supporting member is limited by the height of the frame and this height cannot be too great without making the truck excessively unwieldly and reducing to an unwarranted extent the headroom required for movement of the truck.

Various attempts have been made to increase the range of movement of the supporting member, and these have included the mounting of the usual vertical frame carrying the supporting member on the end of a jib which is pivoted to the chassis of the truck. In another arrangement, the supporting member was attached to the end of a jib which was itself displaceable upwards and downwards in a substantially vertical frame. It has also been proposed to provide a load handling vehicle having a boom which can be telescopically extended.

It is an object of the present invention to provide a forklift truck which will enable an exceptional range of movement of the supporting member with safety.

According to the present invention the substantially vertical frame in which the supporting member moves is mounted on the free end of a jib member which itself is pivoted to link means mounted at or near the forward end of the truck chassis and which is angularly displaceable from a rearwardly inclined attitude where it lies over the truck chassis to a substantially vertical attitude, the jib member being angularly displaceable relative to the link means from a position where it makes an acute angle with the link means to a position where it makes an obtuse angle therewith. First and second operating means are provided for effecting the respective angular displacements of the link means relative to the truck chassis and the jib member relative to the link means and further means are provided to maintain the said frame constantly in its substantial vertical attitude whatever the attitude of the jib member.

The jib member may be cranked to provide at its free end a limb which, when the link means is in its rearwardly inclined attitude over the truck chassis and the jib member makes the minimum angle with the link means, is downwardly directed so that its end is adjacent the ground, the vertical frame being pivoted at this end. Said second operating means may then be effective between an intermediate point on said link means and a point on said limb. Each of the first and second operating means may comprise hydraulic or pneumatic ram means. Said further means to maintain the frame in its substantially vertical attitude may also comprise hydraulic or pneumatic ram means operable under the control of a gravity-sensitive means on the frame.

One form of the invention will now be further described with reference to the accompanying drawings wherein.

Figure 1:
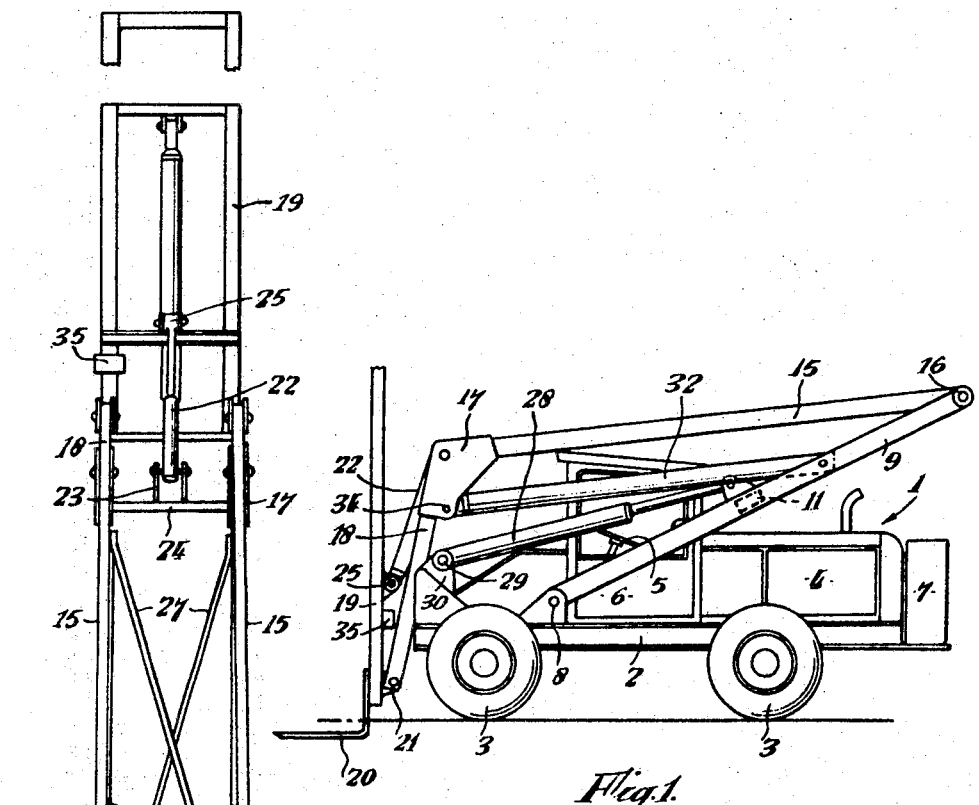
FIG. 1 is side elevation of the forklift truck with its several components in a folded state.

As shown in the drawings the forklift truck 1 has a chassis 2 mounted through axles on road wheels 3. The truck is provided with means for moving and steering the same including an engine 4 and steering wheel 5 located within a driver's cab 6. At the rear end of the truck, behind the engine 4, is located a counterweight 7 to give stability when the forklift apparatus is in use.

Link means, generally indicated by the reference numeral 10 comprise two link arms 9 each pivoted at 8 to the truck chassis near the forward end thereof. The link arms 9 are braced by crossmembers 11, 12, sufficient space being left below the crossmember 11 for the link means to pivot from the position shown in FIG. 1 to that shown in FIG. 2 without fouling the cab roof. Two longitudinal members 13 are fixed between the transverse members 11 and 12. Pivoted to the free end of the link arms 9 is a jib member having cranked jib arms 14, each consisting of a long arm portion 15 pivoted to a respective one of the link arms 9 at 16 and bearing at its free end a bracket 17 by which it is secured to a shorter arm portion 18. The jib member is braced by struts 24 and 26 and diagonal bracing 27. As best seen in FIG 1 the free ends of the arm portion 18, when the components are in the folded state, are quite close to the ground and to these free ends is pivoted at 21 the usual vertical frame 19 in which the fork platform or other supporting member 20 is displaceable upwards and downwards. No further details need be given herein of the manner in which the supporting member 20 is moved upwardly and downwardly in the frame 19 since this mechanism is standard and well known in the art. An hydraulic ram 22 is pivoted at one end to a member 23 mounted on a strut 24 between the brackets 17 and at the other end to a bracket 25 on the frame 19 above the pivots 21 by which this frame is attached to the ends of the arm portions 18. This ram 22 serves, under the control of a damped pendulum-operated hydraulic control valve 35, to maintain the frame 19 in its substantially vertical position whilst the jib member and link means are being articulated. Such constant level devices are known of themselves in other arts and need not be described in further detail. The ram 22 can be operated under manual control if desired to swing the frame 19 about a small angle of up to 10° either backwards or forwards, either for example for the purpose of holding the load more securely during motion or for enabling it to be tipped forward and discharged from the supporting member 20.

Figure 3:
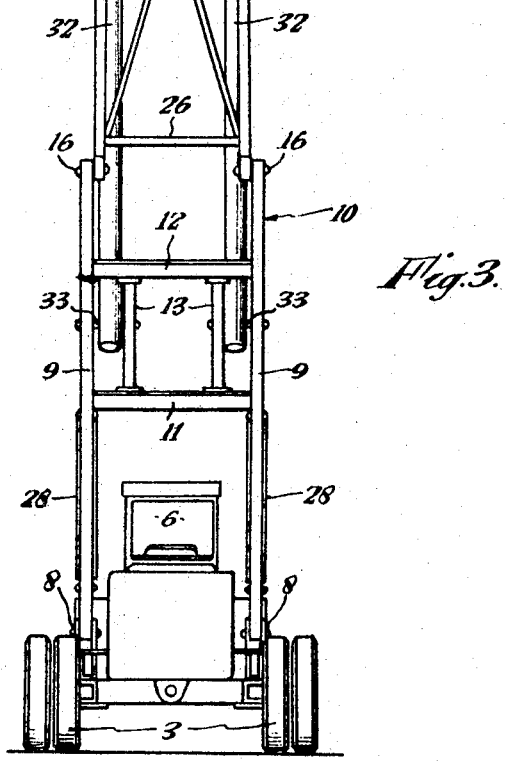
FIG. 3 is a rear view of the forklift truck with its components in an extended state.
Figure 2:
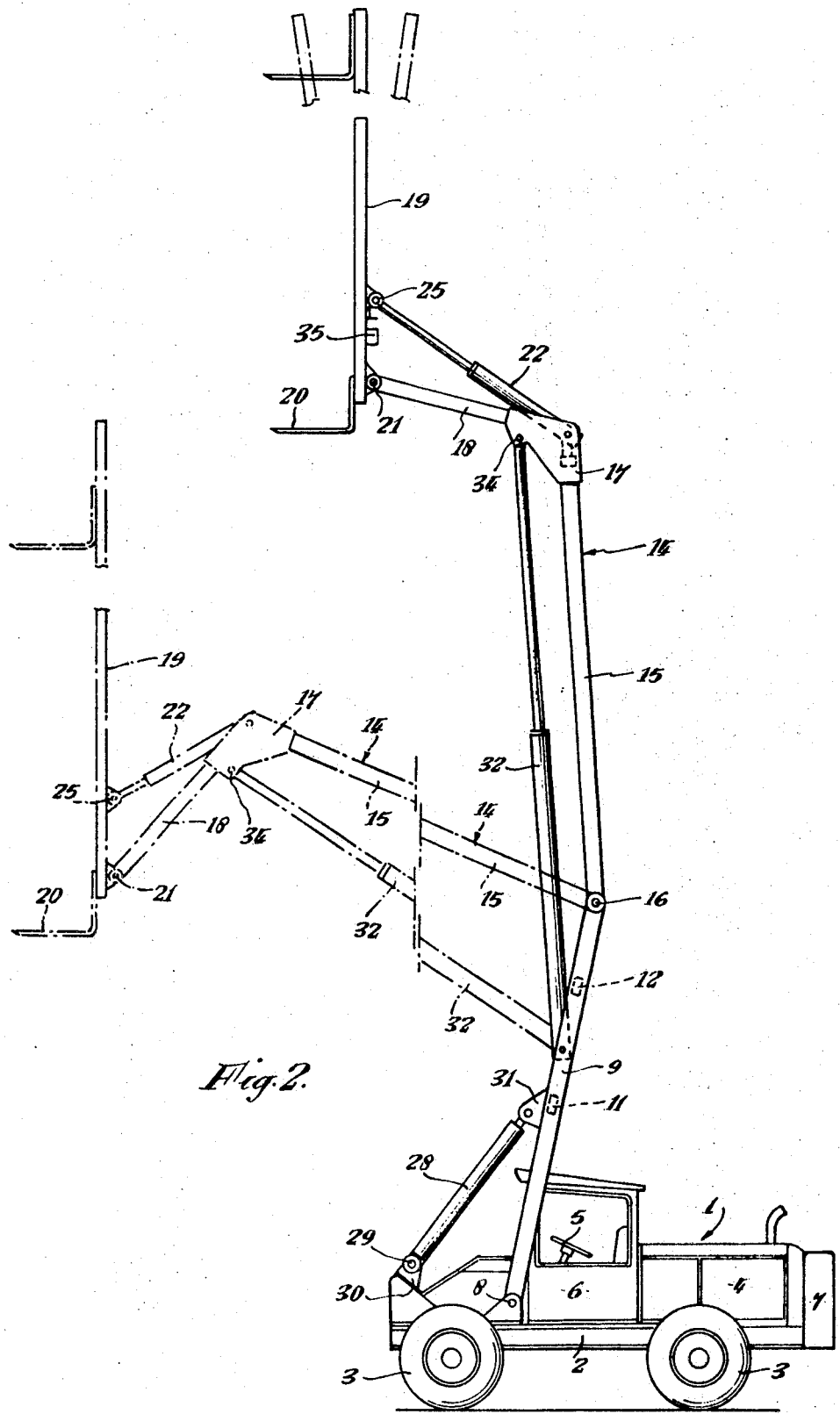
FIG. 2 is a similar view showing the components in an extended state, and also showing in chain lines a further position of the jib member.

First operating means are provided for effecting the angular displacement of the link means relative to the truck chassis. In the embodiment illustrated this comprises two hydraulic rams 28, each consisting of the usual piston and cylinder and which are connected together to work in unison. Each ram is pivoted at its lower end at 29 to a bracket 30 on the truck chassis and at its upper end to a bracket 31 fixed to the link arm 9 opposite the crossmember 11. It can readily be seen that in FIG. 1 the piston rod is fully extended, and when this is contracted this raises the link means to a substantially upright position as shown in FIGS. 2 and 3.

Second operating means for effecting angular displacement of the jib member relative to the link means comprises two hydraulic rams 32 connected together to work in unison, these being mounted at one end at 33 in trunnions between the link arms 9 and the longitudinal members 13 and pivoted at the other end 34 to a respective one of the brackets 17 at that portion of the bracket which supports the shorter arm portion 18 of the jib arm. In the position shown in FIG. 1 the pistons of the rams 32 are fully withdrawn into the cylinders and the jib member makes an acute angle of some 20° with the link means. As the rams 28 are operated to bring the link means into the substantially vertical position, the rams 32 can be simultaneously extended to increase the angle between the jib member and the link means, until the jib member is at an angle of more than 160° with the link means as shown in FIG. 2. This means that the supporting member 20 can be raised from ground level up to a height which is approximately equal to the combined lengths of the link arms 9 and the arm portions 15, whilst at the same time the supporting member 20 need not be allowed to move forward any substantial distance, thus ensuring that the turning moment of the load around the front axle of the truck keeps well within the safety limits afforded by the counterweight 7. If desired the controls for operating the rams 28 and 32 may be interlinked so that from the positions shown in FIG. 1 the rams 32 cannot be operated without also operating the rams 28; this will prevent the rams 32 being mistakenly operated from the folded position to move the vertical frame 19 and supporting member 20 rearwardly over the top of the truck. It will be appreciated that, as is usual with forklift trucks, further vertical movement of the supporting member 20 can be achieved by displacing it upwards and downwards along the supporting member 19.

If desired, the rams 32 may be operated independently of the rams 28, when the latter are in their contracted position so that the link means is substantially vertical. This movement of the rams 32 swings the jib member forwardly as shown in chain lines in FIG. 2, thus enabling the supporting member 20 to serve a location ahead of the position of the truck chassis 2. This may be extremely useful when the forklift truck is to serve a building or other location which is separated from the road or other hard surface on which the truck can move by a ditch, a wall or pile of rubble.

I claim:

1. A lift truck having a chassis, link means mounted at or near the forward end of the chassis and angularly displaceable from a rearwardly inclined attitude where it lies over the truck chassis to a substantially vertical attitude, a jib member pivoted at one end to the link means, the jib member being angularly displaceable relatively to the link means from a position where it makes an acute angle with the link means to a position where it makes an obtuse angle therewith, a substantially vertical frame mounted on the other end of the link means, a supporting member in the frame displaceable upwards and downward therewithin, a first operating means mounted between the link means and the truck chassis for effecting the angular displacement of the link means relative to the truck chassis, a second operating means mounted between the jib member and the link means at a position on the link means remote from its mounting on the truck chassis for effecting the angular displacement of the jib member relative to the link means, the two operating means being independently actuable so that the angle between the jib member and the link means can be varied whatever the position of the link means relative to the truck chassis, and further means to maintain said frame constantly in its substantially vertical attitude whatever the attitude of the jib member.

2. A lift truck according to claim 1, wherein the jib member has at its free end a limb which, when the link means is in its rearwardly inclined attitude over the truck chassis and the jib member makes the minimum angle with the link means, is downwardly directed so that its end is adjacent the ground, the vertical frame being pivoted at this end.

3. A lift truck according to claim 2 wherein said second operating means is effective between an intermediate point on said link means and a point on said limb.

4. A lift truck according to claim 1 wherein each of the first and second operating means comprises hydraulic or pneumatic ram means.

5. A lift truck according to claim 1 wherein said further means to maintain the frame in its substantially vertical attitude comprise hydraulic or pneumatic ram means operable under the control of a gravity-sensitive means on the frame.

6. A lift truck according to claim 2 wherein said further means to maintain the frame in its substantially vertical attitude comprise hydraulic or pneumatic ram means operable under the control of a gravity-sensitive means on the frame.